(12) United States Patent
Bauer et al.

(10) Patent No.: US 9,889,812 B1
(45) Date of Patent: Feb. 13, 2018

(54) SIDE-CURTAIN AIRBAG ASSEMBLY

(71) Applicant: Ford Global Technologies, LLC, Dearborn, MI (US)

(72) Inventors: William Charles Bauer, Canton, MI (US); Jason Richard Nagy, Commerce Township, MI (US); Jeffrey Charles Paddock, Dearborn Heights, MI (US); Mahesh Bhattacharyya, Novi, MI (US); Salvatore Joseph Moceri, Rochester Hills, MI (US); Kattya Gabriela Miranda Quintana, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/340,038

(22) Filed: Nov. 1, 2016

(51) Int. Cl.
*B60R 21/213* (2011.01)
*B60R 21/232* (2011.01)
*B60R 21/231* (2011.01)
*B60R 21/16* (2006.01)

(52) U.S. Cl.
CPC .......... *B60R 21/213* (2013.01); *B60R 21/231* (2013.01); *B60R 21/232* (2013.01); *B60R 2021/161* (2013.01)

(58) Field of Classification Search
CPC ............ B60R 21/213; B60R 21/23138; B60R 21/232; B60R 2021/161
See application file for complete search history.

(56) References Cited

U.S. PATENT DOCUMENTS

| | | | | |
|---|---|---|---|---|
| 6,254,123 B1 * | 7/2001 | Urushi | ................... | B60R 21/213 280/730.2 |
| 6,305,707 B1 * | 10/2001 | Ishiyama | ............... | B60R 21/213 280/728.2 |
| 6,364,349 B1 * | 4/2002 | Kutchey | ............... | B60R 21/213 280/728.3 |
| 6,371,512 B1 * | 4/2002 | Asano | ................... | B60R 21/213 280/728.2 |
| 6,520,533 B2 * | 2/2003 | Tanase | ................... | B60R 21/213 280/730.2 |
| 6,530,594 B1 * | 3/2003 | Nakajima | ............. | B60R 21/213 280/728.2 |

(Continued)

FOREIGN PATENT DOCUMENTS

DE 10156512 B4 11/2009
WO 2015175587 A1 11/2015

*Primary Examiner* — Laura Freedman
(74) *Attorney, Agent, or Firm* — Jason Rogers; Brooks Kushman, P.C.

(57) ABSTRACT

A side-curtain airbag assembly includes a body structure including a roof rail and a pillar extending downwardly from the roof rail. The roof rail has an upwardly extending side portion and a first ramped surface extending inwardly from the side portion at a downward angle. An airbag is mounted to the side portion above the first ramped surface. A trim component is mounted to the pillar below the first ramped surface and has a face, a top, and a second ramped surface extending outwardly from the top at an upward angle towards the side portion. The first and second ramped surfaces are arranged to form a ramp that guides the airbag during deployment of the airbag. The first ramped surface has a higher yield strength than the second ramped surface.

20 Claims, 4 Drawing Sheets

(56) References Cited

U.S. PATENT DOCUMENTS

| | | | | |
|---|---|---|---|---|
| 6,719,321 | B2* | 4/2004 | Yasuhara | B60R 21/04 280/730.2 |
| 6,832,800 | B2* | 12/2004 | Hwang | B60R 13/0206 296/187.05 |
| 7,322,601 | B2* | 1/2008 | Bertossi | B60R 21/213 280/730.2 |
| 7,404,790 | B2* | 7/2008 | Sugaya | B60R 21/213 280/743.1 |
| 7,806,433 | B2* | 10/2010 | Mitsuo | B60R 13/0225 280/728.2 |
| 8,500,162 | B2 | 8/2013 | Moffitt et al. | |
| 9,016,717 | B1* | 4/2015 | Clauser | B60R 21/233 280/729 |
| 2007/0241542 | A1 | 10/2007 | Wallace | |

\* cited by examiner

_(12)_ United States Patent US 9,889,812 B1

SIDE-CURTAIN AIRBAG ASSEMBLY

TECHNICAL FIELD

The present disclosure relates to side-curtain airbag assemblies and specifically to airbag-guide ramps formed by vehicle body structures and trim components that are proximate the airbag.

BACKGROUND

Modern motor vehicles, such as passenger cars, have side-curtain air bags that deploy over the longitudinal sides of a vehicle cabin to reduce occupant injury during an impact event by providing a cushioning layer between the vehicle interior and the occupant. Side-curtain airbags are stowed along the roof rail and are hidden by the headliner and interior trim components. Air pressure from the inflator forces the airbag between the headliner and the trim components during deployment.

Trim components include edges susceptible to entanglement with the airbag during deployment. This can cause improper deployment of the airbag and damage to the trim components. Some airbags include a sail cloth or tether that deploys over the trim components to guide the airbag during deployment. Sail clothes and tethers can catch behind the trim component causing damage to the trim component.

Other airbag-guide solutions use a portion of a trim component to guide the airbag during deployment. Trim components are typically made of plastic, which may fracture during airbag deployment. The brittleness of plastic increases as temperatures decreases, which increases the susceptibility of trim-component fracture at cold temperatures. Ever-increasing safety standards are causing automakers to use more powerful inflators that eject the airbag at higher forces. These forces are sufficient to fracture plastic guides, especially at low temperatures. The strength of the trim components can be increased by using exotic materials and thicker panels, however, this increases costs of the trim components. As such, forming airbag guides solely from trim components has several disadvantages.

SUMMARY

According to an embodiment, a side-curtain airbag assembly includes a structural member and an airbag mounted to the structural member. A trim component is mounted to the structural member below the airbag. An airbag-deployment ramp is disposed below the airbag and projects inwardly from the structural member. The ramp includes a first ramped surface integrally formed with the structural member and a second ramped surface integrally formed with the trim component.

According to another embodiment, a side-curtain airbag assembly includes a roof rail defining a sidewall and a protrusion having a face inboard of the sidewall. A first ramped surface extends at a downward angle from the sidewall to the face. A is pillar connected to the roof rail, and an airbag is connected to the sidewall above the protrusion. A trim component is connected to the pillar and has a second ramped surface adjacent to the first ramped surface to define a downward sloping ramp that guides the airbag during deployment.

According to yet another embodiment, a side-curtain airbag assembly includes a body structure including a roof rail and a pillar extending downwardly from the roof rail. The roof rail has an upwardly extending side portion and a first ramped surface extending inwardly from the side portion at a downward angle. An airbag is mounted to the side portion above the first ramped surface. A trim component is mounted to the pillar below the first ramped surface and has a face, a top, and a second ramped surface extending outwardly from the top at an upward angle towards the side portion. The first and second ramped surfaces are arranged to form a ramp that guides the airbag during deployment of the airbag. The first ramped surface has a higher yield strength than the second ramped surface.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
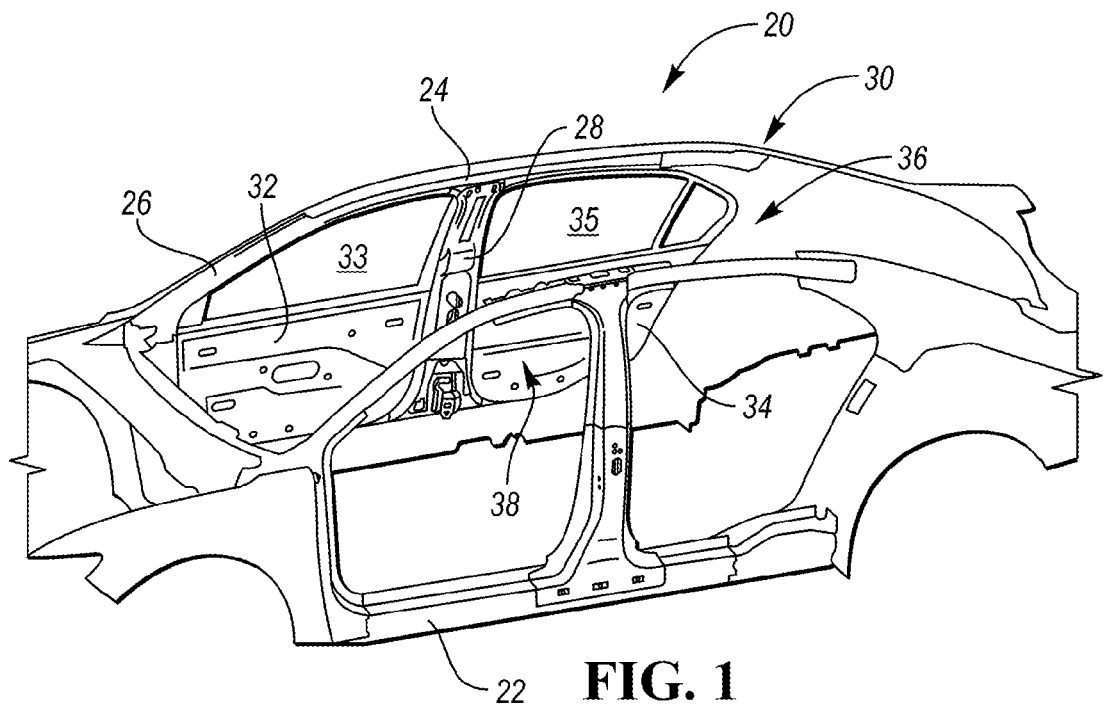
FIG. 1 is a fragmentary perspective view of an example vehicle body.

FIG. 1 illustrates a portion of an example vehicle body referred to generally as vehicle body 20. The vehicle body 20 includes rocker panels 22 spaced from roof rails 24. Pillars extend between the rocker panels 22 and the roof rails 24. For example, the vehicle body 20 includes A-pillars 26, B-pillars 28, and C-pillars 30. The A-pillars 26 are spaced from one another and partially define an opening for a front windshield. The A-pillars 26, the B-pillars 28, the rocker panels 22, and the roof rails 24 define an opening for a front door. The B-pillars 28, the C-pillars 30, the rocker panels 22, and the roof rails 24 define an opening for a rear door. The front door 32 is disposed in the front door opening and includes a window 33. The rear door 34 is disposed in the rear door opening and includes a window 35.

The vehicle body 20 and doors define a passenger cabin 36 having longitudinal interior sides 38 that at least include the doors 32, 34, the A-pillar 26, the B-pillar 28, and the C-pillar 30. The components of the interior sides 38 are covered with trim components, upholstery, and other features that are omitted in the illustration of FIG. 1.

Figure 2:
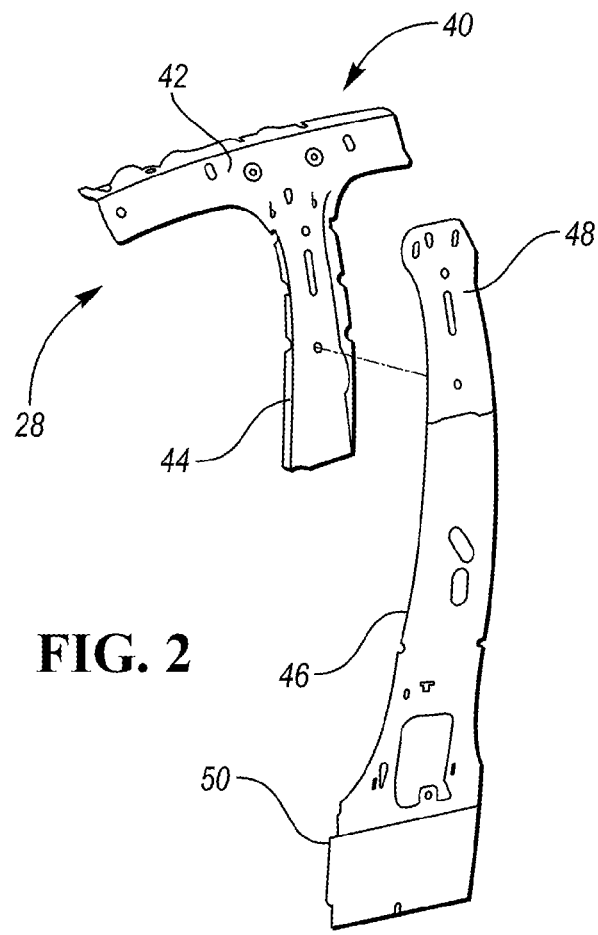
FIG. 2 is an exploded perspective view of two components of a B-pillar of the vehicle body.

Referring to FIG. 2, the vehicle body structure 20 may be formed of a plurality of separate components (such as the illustrated stampings) that are secured together via welds, rivets, fasteners, adhesives, or the like. FIG. 2 illustrates some of the stampings of the example body structure 20 near the B-pillar 28. The stampings may be referred to as the body side inner panels. An upper stamping 40 includes a roof-rail portion 42 that forms a segment of the roof rail 24 and a B-pillar portion 44 extending downwardly from the roof-rail portion 42. A vertical stamping 46 forms intermediate and lower sections of the B-pillar 28 and includes an upper portion 48 connected to the B-pillar portion 44 and a lower portion 50 that connects to the rocker panels 22. Additional stampings may be overlaid with the upper stamping 40 and the vertical stamping 46 to form a complete B-pillar.

Figure 3:
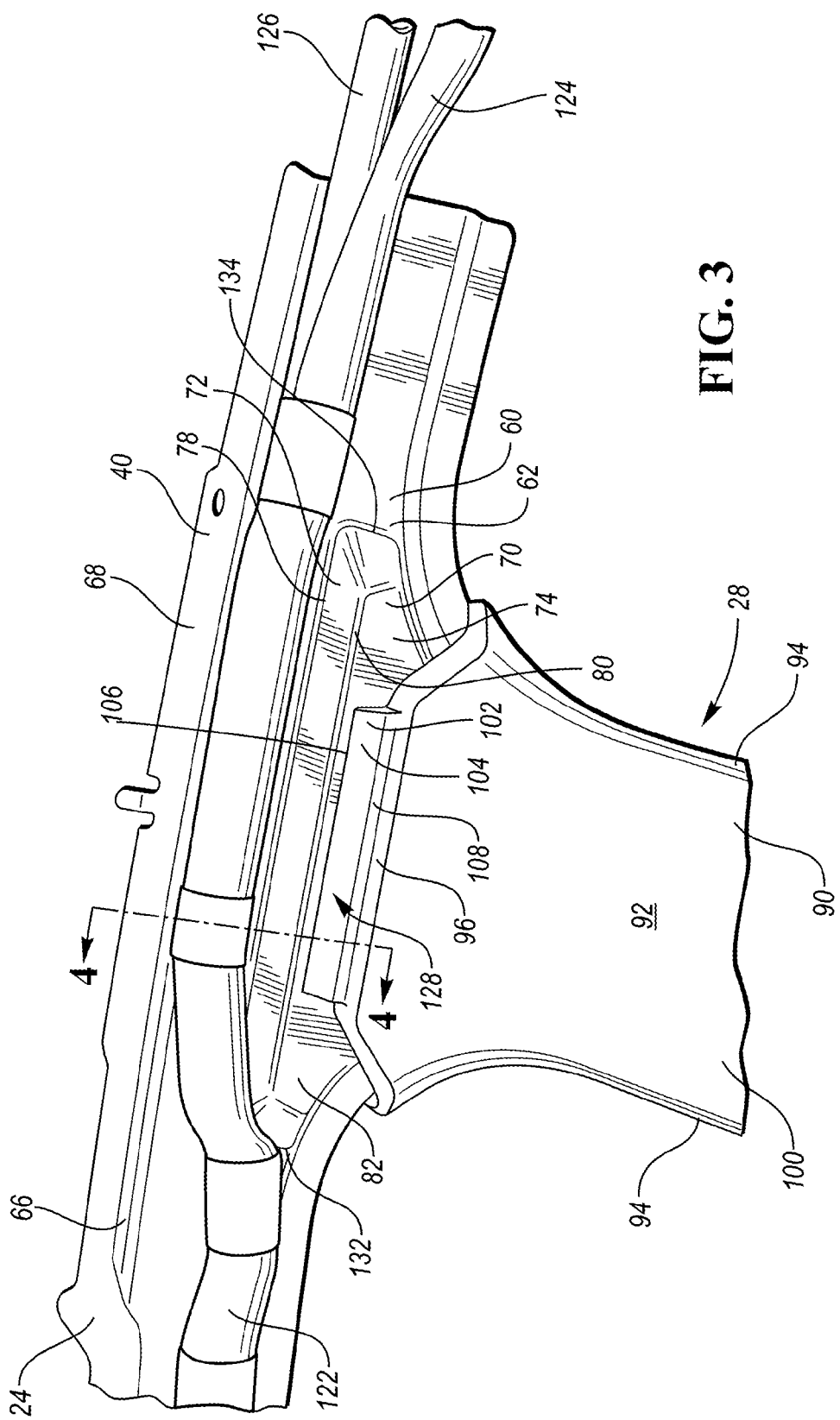
FIG. 3 is a perspective view of the B-pillar and roof-rail joint and a side-curtain airbag assembly in the stowed position.
Figure 4:
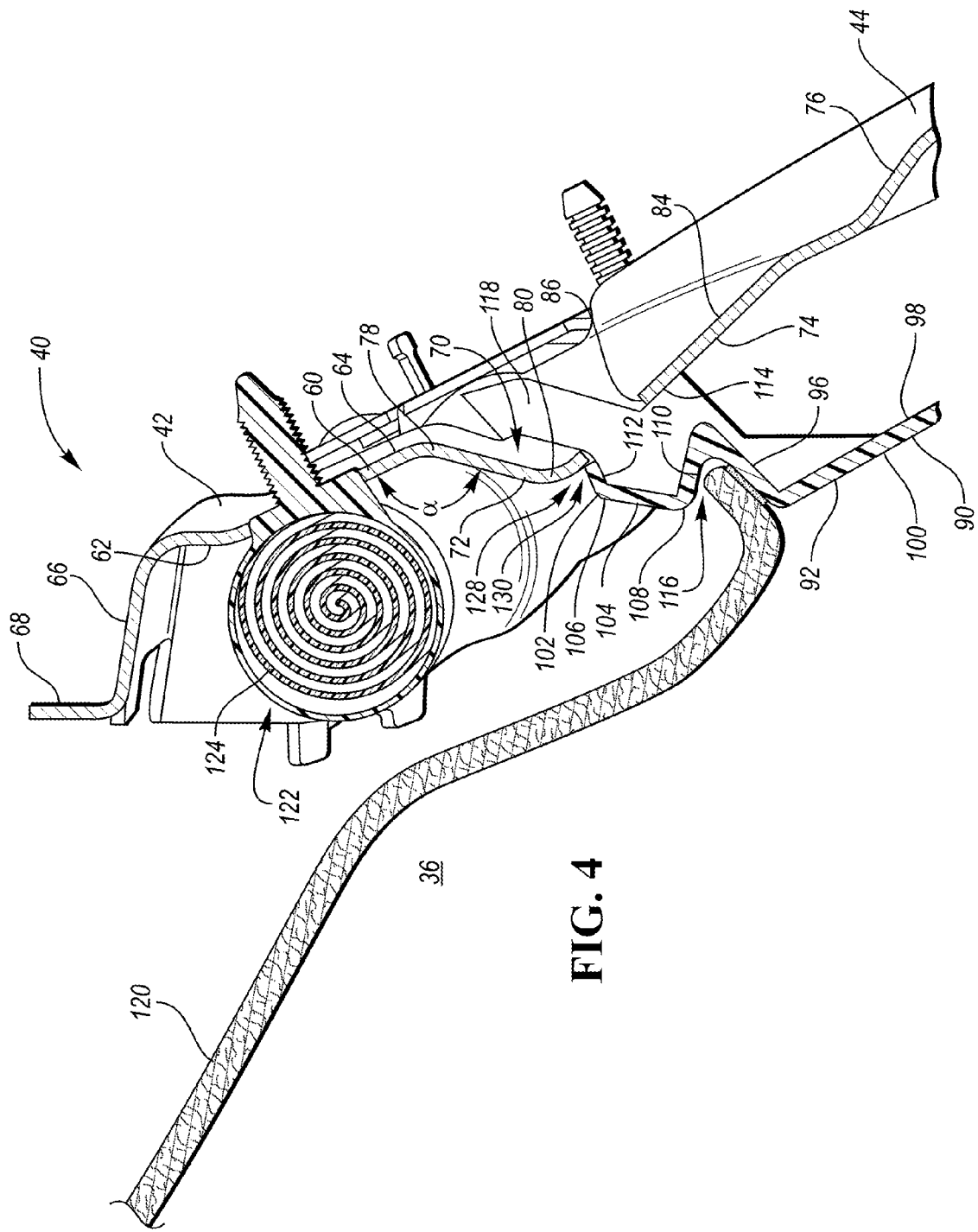
FIG. 4 is a rear cross-sectional view of the joint and airbag assembly taken along line 4-4 in FIG. 3.
Figure 5:
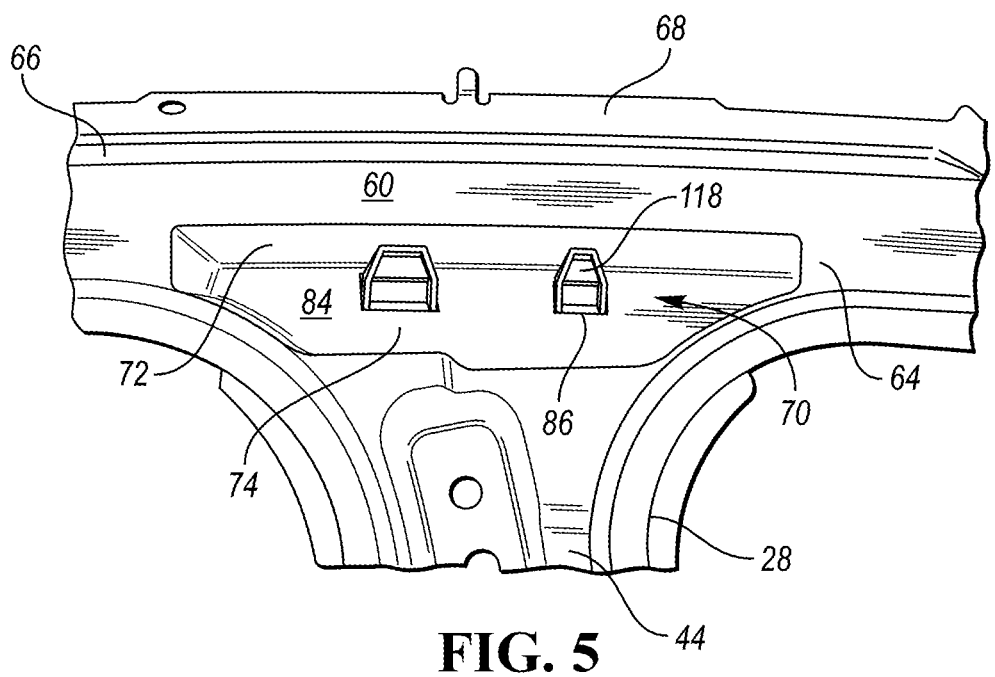
FIG. 5 is a fragmentary side elevation view of a portion of the B-pillar and roof-rail joint.

Referring to FIGS. 3, 4, and 5, the roof-rail portion 42 has an upwardly extending side 60 having a lower end connected with the B-pillar portion 44 and an upper portion. The upper stamping 40 has an inboard side 62 that faces the cabin 36 and an outboard side 64. The outboard side 64 is covered by the outer body panels (not shown) that form the class-A surface of the vehicle. A ceiling 66 is connected to the upper portion of the side 60 and includes a flange 68 that connects to a roof panel (not shown).

The roof-rail portion 42 is formed so that the upwardly extending side 60 defines a protrusion 70 projecting inwardly from the inboard side 62. The protrusion 70 may be formed simultaneously with the roof-rail portion in a stamping process. The protrusion 70 has a ramped surface 72, a face 74, and a lower surface 76. An upper end 78 of the ramped surface 72 intersects with the upwardly extending side 60 and the lower end 80 of the ramped surface 72 intersects with the face 74. The lower surface 76 forms the bottom of the protrusion 70 and extends between the face 74 and the inboard surface 62. The face 74 defines one or more openings 86 that extend completely through the face from a front side 82 to a back side 84.

A trim component 90 is attached to the B-pillar 28 and includes a front face 92 and a pair of opposing sidewalls 94 that extend outboard from the front face 92 to wrap around the sides of the B-pillar 28. The face 92 and the sidewalls 94 may be integrally formed. The trim component 90 includes a visible side 100 and a hidden side 98. A top 96 is connected to the front face 92 and the sidewalls 94 to form a closed upper section at the top of the trim component 90.

An upper projection 102 is disposed on the top 96. The upper projection 102 includes a ramped surface 104, a headliner-notch surface 110, an upper surface 112, and a backside 114. The backside 114 is disposed against the inboard side 62. The upper surface 112 is connected to the backside 114 and extends inboard therefrom. An upper end 106 of the ramped surface 104 connects with the upper surface 112 and extends inboard from the upper surface at a downward angle. A lower end 108 of the ramped surface is connected to an edge of the headliner-notch surface 110. The headliner-notch surface 110 cooperates with the top 96 to define a notch 116 that secures a longitudinal edge of the headliner 120.

Side-curtain airbags 122 are disposed along each of the roof rails 24. Each of the side-curtain airbags 122 includes a cushion 124 that is inflated by an inflator 126. The airbag 122 is stowed in a rolled or folded configuration in a cavity defined between the roof rail 24 and the headliner 120. The airbag 122 may be mounted to the upwardly extending side 60 above the protrusion 70. When deployed, the cushion 124 fills with air and deploys over a corresponding interior longitudinal side 38 to protect the vehicle occupants.

The trim component 90 may be secured to the B-pillar with a combination of fasteners and clips. The upper end of the trim component 90 may include clips 118 that extend through the opening 86 to securely position the ramped surface 104 adjacent to the ramped surface 72. The ramped surfaces 72 and 104 collectively define an airbag-guide ramp 128 that guides the airbag 124 during deployment of the airbag.

Successful deployment of the airbag requires the cushion 124 to be ejected from its stowed location along the roof rail without dislodging any of the trim components, such as trim component 90. Modern inflators are extremely powerful and are capable of forcing the cushion between the trim components and the body structure, which may cause dislodging or fracturing of the trim components. Broken pieces of trim component are problematic as they can make contact with the occupant. Moreover, it is advantageous to minimize damage to the vehicle during deployment of the airbag.

The guide ramp 128 guides the cushion 124 over the trim component 90 to prevent entanglement between the trim component 90 and the cushion 124 during deployment of the airbag. The guide ramp 128 includes a first section defined by the ramped surface 104 and a second section defined by the ramped surface 72. The two ramped surfaces 72, 104 cooperate to generally define the downwardly sloping ramp 128 that deflects the cushion 124 inboard and over the trim component 90. The ramp 128 may be sloped at angle operable to minimize contact between the top 96 and the cushion 124. In some embodiments, the cushion may contact the top 96, albeit with insufficient force to damage or dislodge the trim component 90. The ramp 128 may be continuous or discontinuous. In the illustrated embodiment, the upper end 78 of the lower ramped surface 72 is not disposed against the lower end 108 of the upper ramped surface 104. This arrangement creates a gap 130 between the two ramped surfaces. The gap 130 is small enough that it does not affect the guiding properties of the ramp 128.

When the cushion 124 deploys, it first contacts the ramped surface 104, which is disposed just below the airbag, and subsequently contacts the ramped surface 72. Greater force is applied to the ramped surface 104 than the ramped surface 72 because ramped surface 104 is impacted first by the cushion 124. The forces on the ramped surface 72 are reduced, as compared to the ramped surface 104, not only because the ramped surface 104 absorbs the initial impact of the cushion, but also because the ramped surface 104 deflects the cushion 124 making the collision between the ramped surface 72 and the cushion less direct.

Each of the ramped surfaces 72, 104 serve different roles during the deployment process due to the position of the ramped surfaces relative to the airbag 122. Ramped surface 104 is directly adjacent to the airbag and absorbs the initial impact without yielding and deflects the cushion 124 inboard. Thus, the ramped surface 104 must be formed of a strong material. In contrast, the ramped surface 72 is a guide that directs the cushion 124 along its inwardly deflecting path started by the ramped surface 104. The strength of the ramped surface 72 can be less than the ramped surface 104 because the ramped surface 72 receives less-direct impacts than the ramped surface 104.

The upper component 40 is formed of metal or other high-strength material designed to support the roof of the vehicle. The strength required to support the roof vastly exceeds the strength required to redirect the cushion 124. The upper portion of the ramp 128 is defined by the ramped surface 104, which is integrally formed with the upper component 40. Thus, the upper portion of the ramp 128 is of sufficient strength to not yield when impacted by even the strongest of airbags.

In many applications, the upper component 40 is a metal stamping that can be shaped to include a variety of features such as the protrusion 70. Forming the protrusion 70 into the stamping is a cost-effective way of placing a ramped surface under the airbag. Since the protrusion 70 is integrally formed, it is less likely to become dislodged than a separate metal component attached to the roof rail below the airbag. Integrally forming the protrusion also is cost-effective, requires fewer components, and does not require assembly.

The lower portion of the ramp 128 may be integrally formed with the trim component 90, as proposed above, because the trim component is strong enough to withstand the secondary forces applied to the lower segment of the ramp 128. By forming the ramp 128 from components already present on the vehicle, efficiencies are gained as additional parts, such as ramp inserts, are not required.

The width of the protrusion 70 is measured between the forward end 132 and the rear end 134. The width may vary according to the size of the B-pillar and the trim component. In some embodiments, the width of the protrusion 70 is wider than the width of the trim component. This prevents the airbag from snagging the outer side edges of the trim component during deployment. In other embodiments, this increased width may be unnecessary and this disclosure is not limited to protrusions that are wider than the B-pillar trim component. In the illustrated embodiments, the trim component 90 includes a closed top 96 that helps prevent the airbag 122 from wedging behind the trim component. The ramp 128 may be used with open top trim components because the ramp deflects the cushion over the trim component.

The angle (α) of the guide ramp 128 relative to the upwardly extending side 60 may be between 100 and 170 degrees depending upon the vehicle design. Steeper angles reduce the impact forces between the cushion 124 and the guide ramp 128, while flatter angles increase the lateral displacement of the cushion 124 relative to the trim component 90. In the illustrated embodiment, the upper section 104 and the lower section 72 of the guide ramp 128 have the same angle relative to the side 60 forming a ramp 128 having a constant downward slope. In other embodiments, the slope of the airbag-guide ramp may change due to the upper ramped surface and the lower ramped surface having different angles relative to the upwardly extending side 60.

Figure 6:
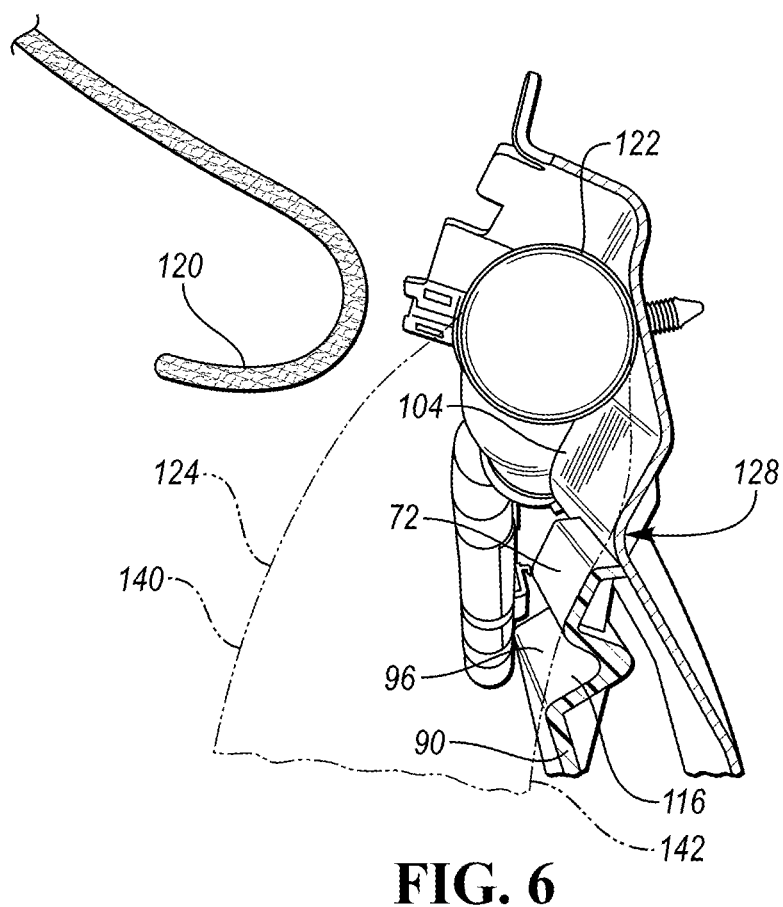
FIG. 6 is a rear cross-sectional view of the airbag assembly with phantom lines showing the air bag deployed.

Referring to FIG. 6, the side-curtain airbag 122 is shown with phantom lines in the deployed position. The inflator 126 is in fluid communication with the cushion 124 and causes the cushion to inflate in response a signal from at least one vehicle controller. Inflation of the cushion 124 cause the cushion to deploy from the upper side of the interior to cover the doors, windows, pillars, and other areas of the cabin. The airbag 122 may include a diffuser tube and a pressure-control device to aid in the inflation of the cushion 124. Deployment of the cushion 124 pushes the edge of the headliner 120 from the notch 116.

The cushion 124 may include an outer side 142 that contacts guide ramp 128 during deployment. An inner side 140 may also contact the ramp 128 during deployment depending upon how the cushion is packaged in the stowed position. When the airbag 122 deploys, the cushion 124 inflates downwardly and contacts the upper ramped surface 104. The normal force exerted by the ramped surface deflects the cushion inboard along the ramped surface. The cushion then contacts the lower ramped surface 72 as it continues to inflate. The normal force exerted by the ramped surface 72 deflects the cushion inboard and over the top 96 of the trim component 90 to prevent improper deployment of the cushion. When fully deployed, the cushion covers the longitudinal side 38 of the interior to prevent impact between an occupant and the side 38.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A side-curtain airbag assembly comprising:
   a structural member including a first ramped surface extending downward and inward from the member;
   an airbag mounted to the structural member; and
   a trim component mounted to the structural member below the airbag and including a face, a top, and a second ramped surface extending outward from the top at an upward angle; wherein
   the first and second ramped surfaces form a ramp that guides the airbag during deployment.

2. The airbag assembly of claim 1, wherein the structural member defines a side portion and a protruding face that is offset inboard from the side portion, wherein the first ramped surface extends from the side portion to the protruding face.

3. The airbag assembly of claim 2, wherein the protruding face defines an opening, and the trim component defines a clip extending through the opening.

4. The airbag assembly of claim 2, wherein the first ramped surface extends downwardly from the side portion at an angle defined between the first ramped surface and the side portion, wherein the angle is between 100 and 170 degrees.

5. The airbag assembly of claim 1, wherein the first ramped surface and the second ramped surface are spaced apart to define a gap.

6. The airbag assembly of claim 1, wherein the structural member includes a roof-rail portion and a pillar portion, and wherein the airbag is mounted to the roof-rail portion and the trim component is mounted to the pillar portion.

7. The airbag assembly of claim 1 further comprising a headliner having a longitudinal edge received in a notch defined by a top of the trim component and the airbag-deployment ramp.

8. A side-curtain airbag assembly comprising:
   a roof rail defining a sidewall and a protrusion that has a face inboard of the sidewall and a first ramped surface extending at a downward angle from the sidewall to the face;
   a pillar connected to the roof rail;
   an airbag connected to the sidewall above the protrusion; and
   a trim component connected to the pillar below the first ramped surface and including a face, a top, and a second ramped surface extending outwardly from the top at an upward angle towards the face, wherein the first and second ramped surfaces are arranged to form a ramp that guides the airbag during deployment of the airbag.

9. The airbag assembly of claim 8, wherein the protrusion and the sidewall are integrally formed portions of the roof rail.

10. The airbag assembly of claim 8, wherein the protrusion further includes a lower surface extending between the face and the sidewall.

11. The airbag assembly of claim 8 further comprising a headliner received in a notch defined by a top of the trim component and the second ramped surface.

12. The airbag assembly of claim 8, wherein the first and second ramped surfaces are spaced apart to define a gap.

13. The airbag assembly of claim 8, wherein the face defines an opening, and the trim component defines a clip disposed in the opening.

14. The airbag assembly of claim 8, wherein the protrusion has a width measured between a forward end and a rear end, and wherein the width of the protrusion is wider than a width of the trim component.

15. The airbag assembly of claim 8, wherein the trim component includes a top and the second ramped surface extends from the top at an upward angle.

16. A side-curtain airbag assembly comprising:
   a body structure including a roof rail and a pillar extending downwardly from the roof rail, the roof rail having an upwardly extending side portion and a first ramped surface extending inwardly from the side portion at a downward angle;
   an airbag mounted to the side portion above the first ramped surface; and
   a trim component mounted to the pillar below the first ramped surface and including a face, a top, and a second ramped surface extending outwardly from the top at an upward angle towards the side portion; wherein
   the first and second ramped surfaces are arranged to form a ramp that guides the airbag during deployment of the airbag, and the first ramped surface has a higher yield strength than the second ramped surface.

17. The airbag assembly of claim 16, wherein the roof rail defines a protrusion having a face that defines an opening, the first ramped surface extends between the face and the side portion, and the trim component defines a clip that is disposed in the opening.

18. The airbag assembly of claim 16, wherein the first ramped surface is integrally formed with the upwardly extending side portion.

19. The airbag assembly of claim 16, wherein the first and second ramped surfaces are spaced apart to define a gap in the ramp.

20. The airbag assembly of claim 16 further comprising a headliner received in a notch defined by the top of the trim component and a lower edge of the second ramped surface.

* * * * *